Jan. 9, 1934.  M. M. CONDRON  1,943,266
AUTOMATIC ADJUSTING SPLINED GEAR WHEEL SEAT
Filed April 2, 1932
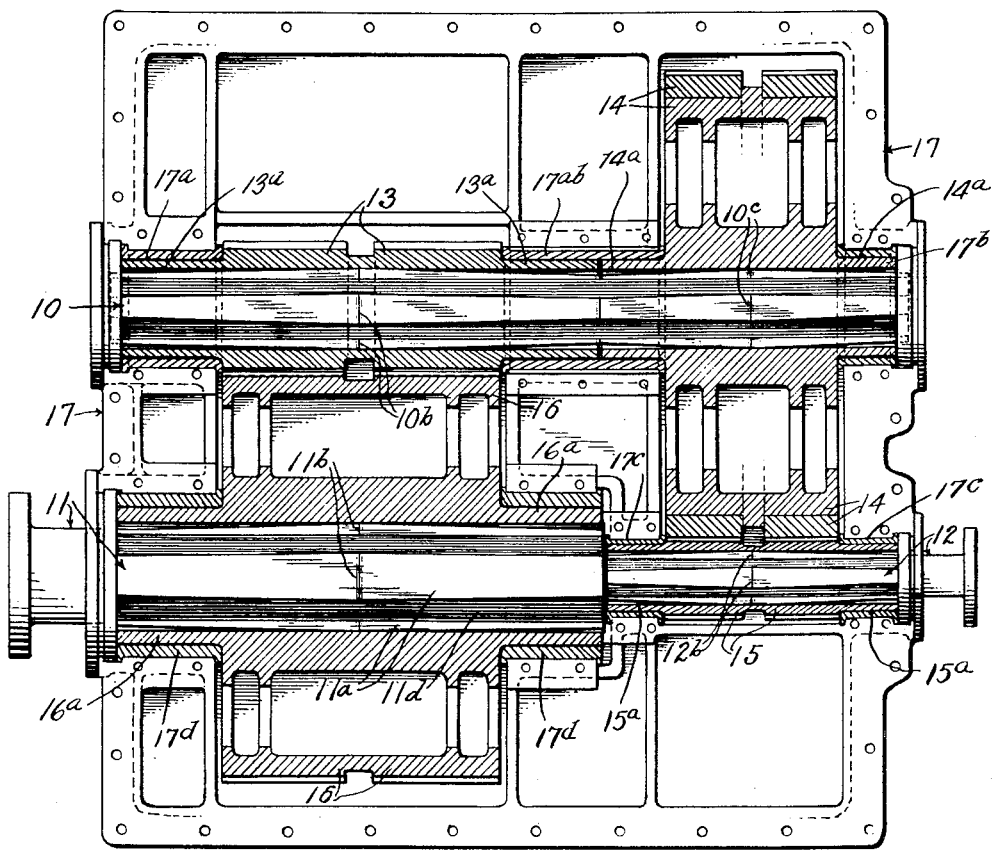
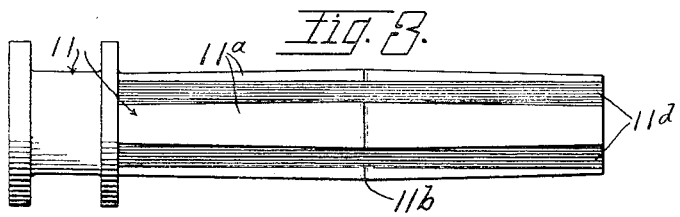
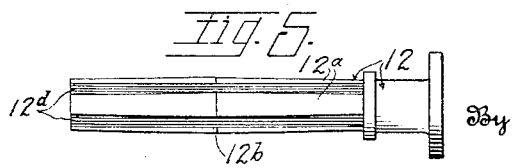
Inventor,
M. M. CONDRON.
By Sterling P. Buck,
Attorney.

Patented Jan. 9, 1934

1,943,266

UNITED STATES PATENT OFFICE 1,943,266

AUTOMATIC ADJUSTING SPLINED GEAR-WHEEL-SEAT

Mark M. Condron, Memphis, Tenn.

Application April 2, 1932. Serial No. 602,768

2 Claims. (Cl. 74—28)

This invention relates to splined shafting, and especially to an automatic adjusting splined gear-wheel-seat.

In order that the objects and purposes of my invention may be fully and clearly understood, the following explanation is given as to the action and the disadvantages of the usual forms of shafting when used for carrying gear wheels in certain combinations; and it may be advantageous to consider a concrete case such, for instance, as a double reduction gear mechanism of 1000 nominal horse power with 3600 R. P. M. for the high speed shaft, and about 180 R. P. M. for the low speed shaft. Now consider the two intermediate gears, the high speed gear and the low speed pinion which are keyed on one shaft as in common practice; and assume that the horse power and proportions of the gears are such that the tangential thrust of the tooth action will be 4850 pounds for the high speed gear, such thrust being directed downward, and the thrust of the low speed pinion directed upward and amounting to 18,000 pounds. The combination of such thrusts produces a moment on the shaft longitudinally around the center of the middle bearing as the axis. This moment is resisted by the outboard bearings. As the thrust of one of the gears is upward, the shaft will tend to lie against the top of the bearings for that gear wheel, and as the thrust on the other gear wheel is downward, the latter will tend to lie on the bottom of the bearing. As the bearings are concentric and have a clearance around the shaft, which they must have, then these forces tend to produce a crook or bend in the shaft and a consequent tilting of the wheel fitted thereon. This crook is continuously changing as the shaft revolves, resulting in loss and inefficiency of the work of the shaft; and such flecture or bending of the shaft produces vibrations which result in a "singing" noise. In other words, this crook in the shaft makes it similar to a crank, and is limited by the bearings but as it swings around the bearings, clearance is produced and maintained on the short radius of the crank arm, and when in line of the thrust action, it jumps across and produces a knock and consequent noise. While the rigidity of the shaft tends to hold it straight, the thrust action tends to throw the gears out of line, and there is improper tooth-contact, the tooth-load coming on one edge of each gear tooth. Therefore, it will be seen that inefficient and noisy operation results from the gear wheels being fixed or rigid on the shafts which carry them.

One object of my invention is to eliminate the mal-adjustment or tilting of the wheels and the consequent disadvantages pointed out in the preceding paragraph, without sacrificing any of the advantages.

Another object is to provide an improved self-adjusting or floating splined shaft mechanism which dispenses with the necessity of using a flexible coupling in connection with a gear mechanism which is of the character described, but which includes my floating splined shafting.

Other objects and important features are pointed out or implied in the following details of description, in connection with the accompanying drawing in which:

Figure 1 is a sectional view illustrating a gear mechanism which is especially designed for reducing the speed in a turbine drive for the propeller of a ship, the section being taken in the plane of the axes of the several splined shafts or axles, but said axles being illustrated in full elevation, the tapers of their splines being exaggerated for more clearly and distinctly emphasizing the invention.

Figure 2 is a side elevation of the shaft which carries the low speed pinion and the high speed gear wheel, which shaft may hereafter be referred to as the intermediate floating shaft.

Figure 3 is a side elevation of the low speed floating shaft which carries the low speed gear wheel.

Figure 4 is an end view of the splined shaft shown in Figure 3.

Figure 5 is a side elevation of the high speed floating shaft which carries the high speed pinion.

Referring to the drawing, in details in which similar reference characters correspond to similar parts in the several views, the invention is described in detail as follows:

Referring to the simple forms of the invention as illustrated in Figures 3, 4, and 5, it should first be understood that there is no essential difference between the device shown in Figure 3 and the one shown in Figure 5, except the difference of dimensions, position, and function. However, different reference characters are used because of the differences just referred to. In Figure 2, the construction is somwhat different, for this shaft is designed for carrying two gear wheels. In other words, it may be considered as two united shafts or sections whose axes are alined. These several shafts are designated by the respective numerals 10, 11, and 12, while the splines thereof are designated 10a, 11a, and 12a. The splines 10a comprise two wheel seats which have their centers at 10b and 10c, while the centers of the wheel seat of the splines 11a and 12a are at 11b and 12b, respectively. It will be seen that these shafts or axles are of greater diameter at the center of the wheel seats than at the ends thereof, in view of the fact that it is desirable for the wheels to have a working fit against these centers or thicker parts of the splines. The splines of each shaft or axle are spaced from one another or separated by grooves 10d, 11d, and 12d, and of course, the wheels are provided with corresponding ribs or splines to fit in these grooves or channels in the shaft.

Referring now to Figure 1, it will be seen that the low speed pinion 13 is carried on its outboard hubs 13a in bearings 17a and 17ab and has its splines interengaged with the wheel seats 10b, that the high speed gear wheel 14 is carried on its outboard hubs 14a in bearings 17ab and 17b and has its splines interengaged with the wheel seat 10c, that the high speed pinion 15 is carried on its outboard hubs 16a in bearings 17c and has its splines interengaged with the wheel seat 12b, and that the low speed gear wheel 16 is carried on its outboard hubs 16a in bearings 17d and has its splines interengaged with the wheel seat 11b. Moreover, it will be seen that the splines of these several gear wheels and pinions, indicated at 13a', 14a', 15a', and 16a', respectively, are rectilinear, so that they normally touch the splines of the shafts or floating axles only at the middle parts of their respective seats of the floating axles. Now, referring again to the middle parts of the wheel seats, it is seen that the splines are not only thicker at these parts, but also wider than at the ends of the wheel seats. In other words, all sides of the splines taper from the middle of the wheel seats to the ends of the wheel seats; but the splines of the wheels do not taper, and the distortions of the shaft do not affect the proper meshing of the teeth of mating gear-wheels engaged therewith and with similar shafts thereby avoiding the disadvantages referred to in a preceding paragraph.

Although the specific form of gear casing 17 is not an essential part of this invention, it is here illustrated for the purpose of showing the relation of these several floating shafts to one another and to the gear wheels and pinions rotated thereby.

Although I have described these embodiments of my invention specifically, I do not intend to limit my patent protection to these exact details of construction and arrangement, for numerous changes may be made within the scope of the inventive ideas as implied and claimed. The use of the invention is not limited to its combination with gear wheels, for it is very effective and useful in a turbo-generator set, and in other combinations, producing very efficient and quiet operation.

What I claim as my invention is:

1. The combination of an internally splined gear wheel, bearings in which said wheel is mounted to turn, and a splined shaft, the splines of the gear wheel being substantially rectilinear on all sides, the splines of the shaft including gear wheel bearing seats which are thicker and wider at their middle parts than at their ends, the splines of the gear-wheel being respectively seated between and against splines of the shaft whereby the splined shaft is permitted to have free movement for adjusting itself to eliminate the tendency to mal-adjust the wheel on its bearings, substantially as described for the purposes specified.

2. The combination of two axially alined gear wheels each having outboard hollow hubs and also having an internal annular series of splines between the hubs, bearings in which the hollow hubs are journalled with enough clearance to provide for easy rotation of the wheels, and a shaft having thereon two annular series of external splines which have bulged middle parts and outwardly tapering end parts, each series of external splines being respectively interengaged with the splines of the respective wheels for effecting rotation of one of these wheels by rotation of the other one of these wheels while eliminating the tendency to tilt either wheel in its bearings.

MARK M. CONDRON.